United States Patent [19]

Earnest

[11] 4,204,401
[45] May 27, 1980

[54] TURBINE ENGINE WITH EXHAUST GAS RECIRCULATION

[75] Inventor: Ernest R. Earnest, Hobe Sound, Fla.

[73] Assignee: The Hydragon Corporation, Lake Park, Fla.

[21] Appl. No.: 817,848

[22] Filed: Jul. 21, 1977

Related U.S. Application Data

[63] Continuation-in-part of Ser. No. 706,811, Jul. 19, 1976, abandoned.

[51] Int. Cl.² .............................................. F02C 1/06
[52] U.S. Cl. .............................. 60/39.03; 60/39.18 R; 60/39.52
[58] Field of Search ........ 60/39.52, 39.18 R, 39.18 B, 60/39.03

[56] References Cited

U.S. PATENT DOCUMENTS

| | | |
|---|---|---|
| 2,360,969 | 10/1944 | Newcombe . |
| 2,911,789 | 11/1959 | Baker .............................. 60/39.18 B |
| 2,955,422 | 10/1960 | Peterson . |
| 3,148,503 | 9/1964 | MacPhail . |
| 3,150,487 | 9/1964 | Mangan et al. .................. 60/39.51 R |
| 3,194,015 | 7/1965 | Pacault . |
| 3,303,646 | 2/1967 | Southam . |
| 3,436,912 | 4/1969 | Squires . |
| 3,500,636 | 3/1970 | Craig . |
| 3,516,248 | 6/1970 | McEwen . |
| 3,541,790 | 11/1970 | Kellet . |
| 3,611,718 | 10/1971 | Nebgen . |
| 3,703,807 | 11/1972 | Rice ..................................... 60/39.52 |
| 3,783,614 | 1/1974 | Walker . |
| 3,785,145 | 1/1974 | Amann . |
| 3,791,137 | 2/1974 | Jubb et al. . |
| 3,796,045 | 3/1974 | Foster-Pegg . |
| 3,802,185 | 4/1974 | Tallock . |
| 3,802,186 | 4/1974 | Mahler . |
| 3,830,062 | 8/1974 | Morgan et al. . |
| 3,899,886 | 8/1975 | Swick ................................... 60/39.27 |

FOREIGN PATENT DOCUMENTS

| | | |
|---|---|---|
| 1006102 | 4/1952 | France ..................................... 60/39.27 |
| 331763 | 7/1930 | United Kingdom ................ 60/39.18 B |
| 605088 | of 0000 | United Kingdom . |

*Primary Examiner*—Robert E. Garrett
*Attorney, Agent, or Firm*—Harness, Dickey & Pierce

[57] ABSTRACT

A method and apparatus for improving the efficiency of an integrated combined cycle Brayton-Rankine engine is disclosed. The engine has a main power turbine operating on an open-loop Brayton cycle. Its air supply is furnished by a compressor independently driven by the turbine of a closed-loop Rankine cycle which derives heat energy from the exhaust of the Brayton turbine. A portion of the exhaust gas is recirculated into the compressor inlet during part-load operation. The recirculation of exhaust gas improves the efficiency of the engine at part-load over that which would occur with only ambient temperature air entering the compressor. Also, the controlled application of exhaust gas recirculation improves the dynamic response of the engine to demands for changes in power output and is predicted to reduce the emission of polluting nitrous oxides from the engine combustor.

18 Claims, 11 Drawing Figures

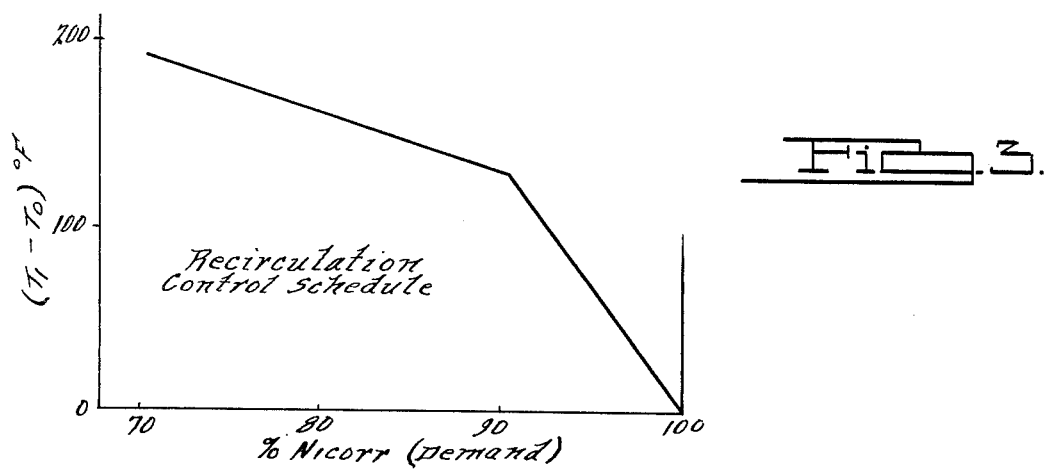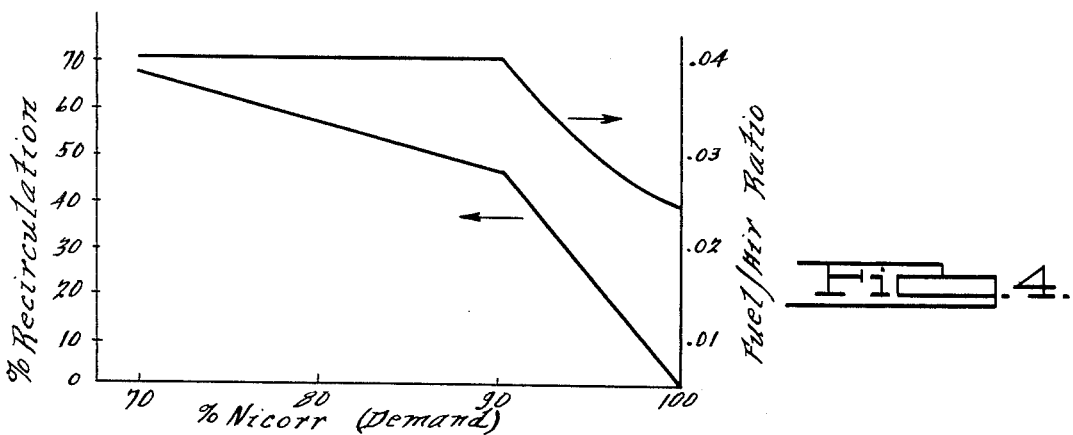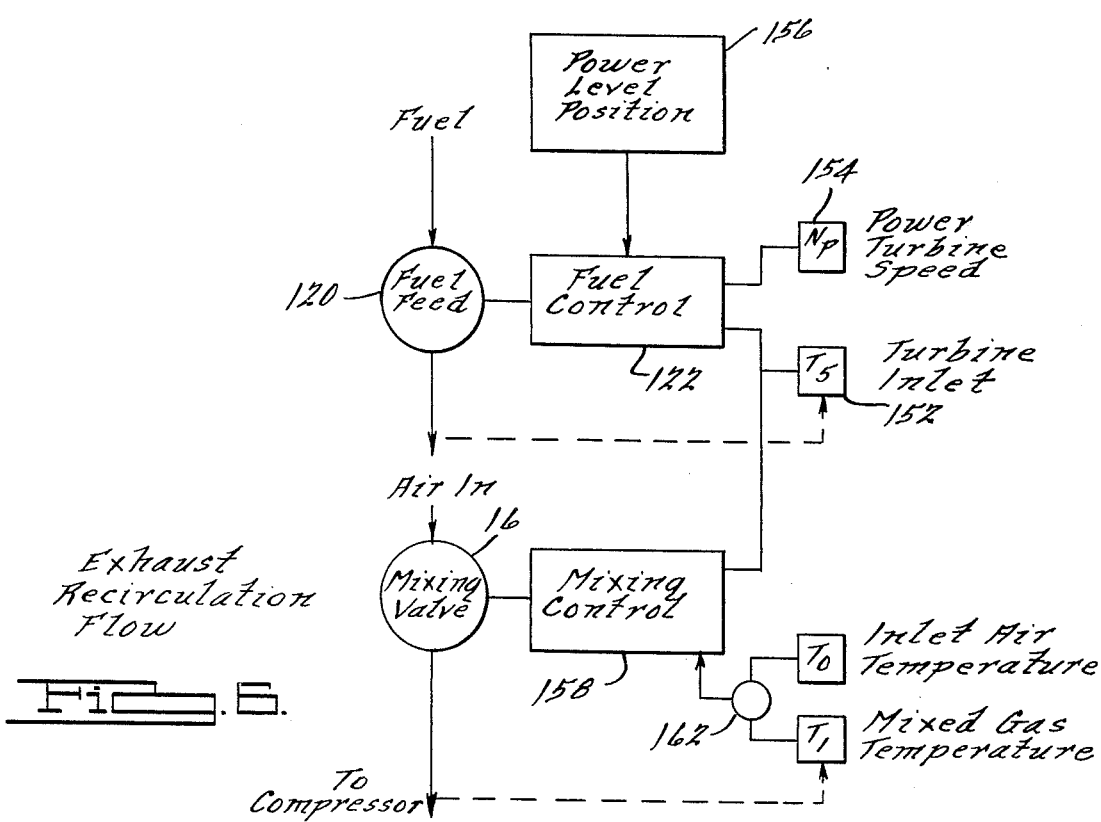

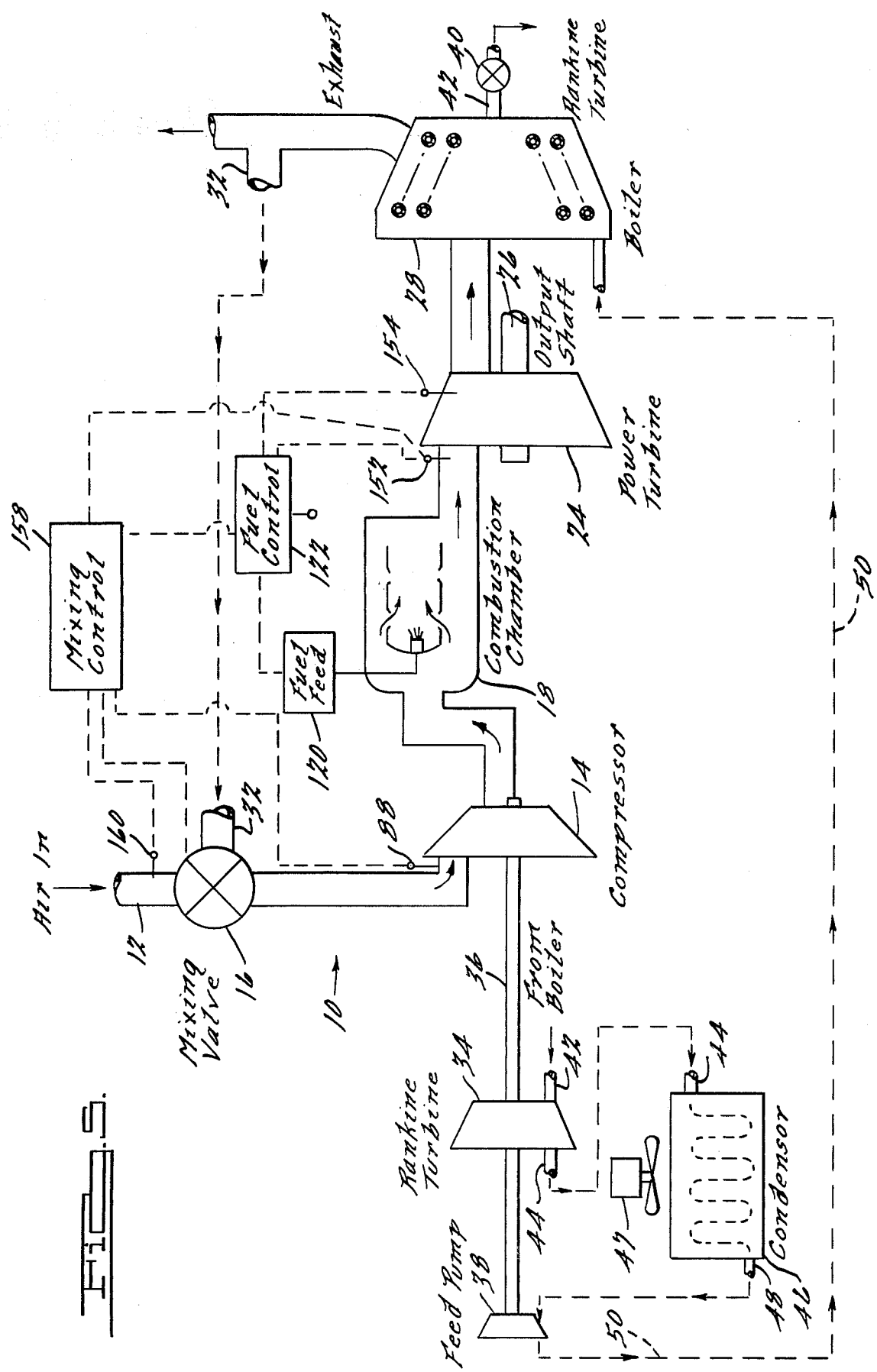

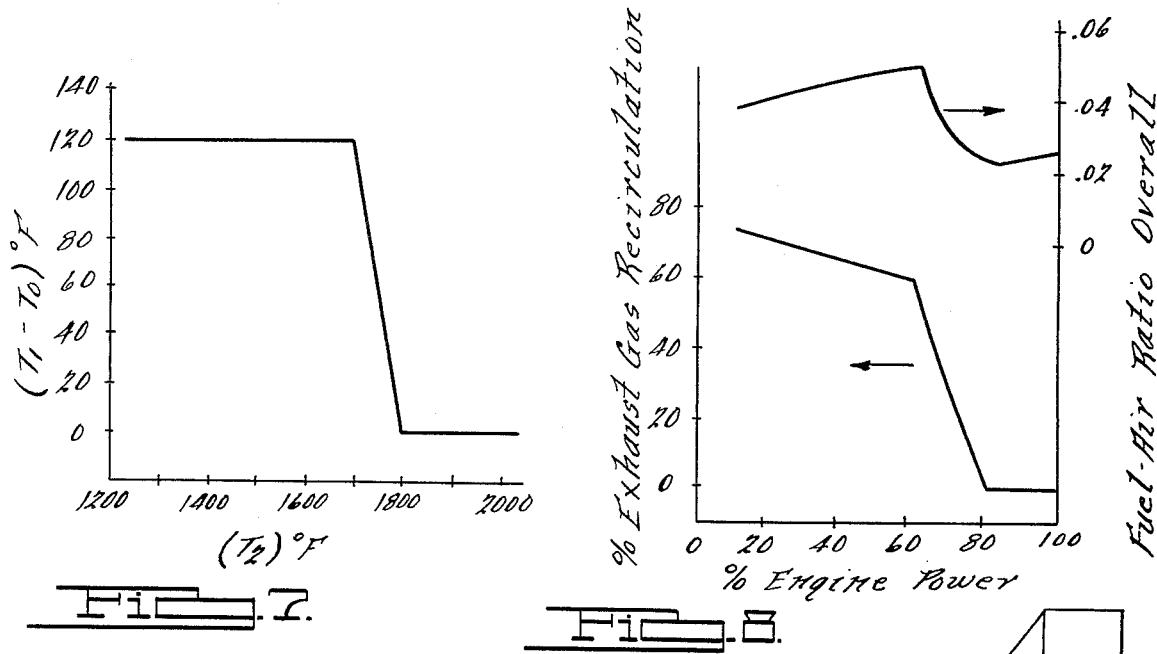
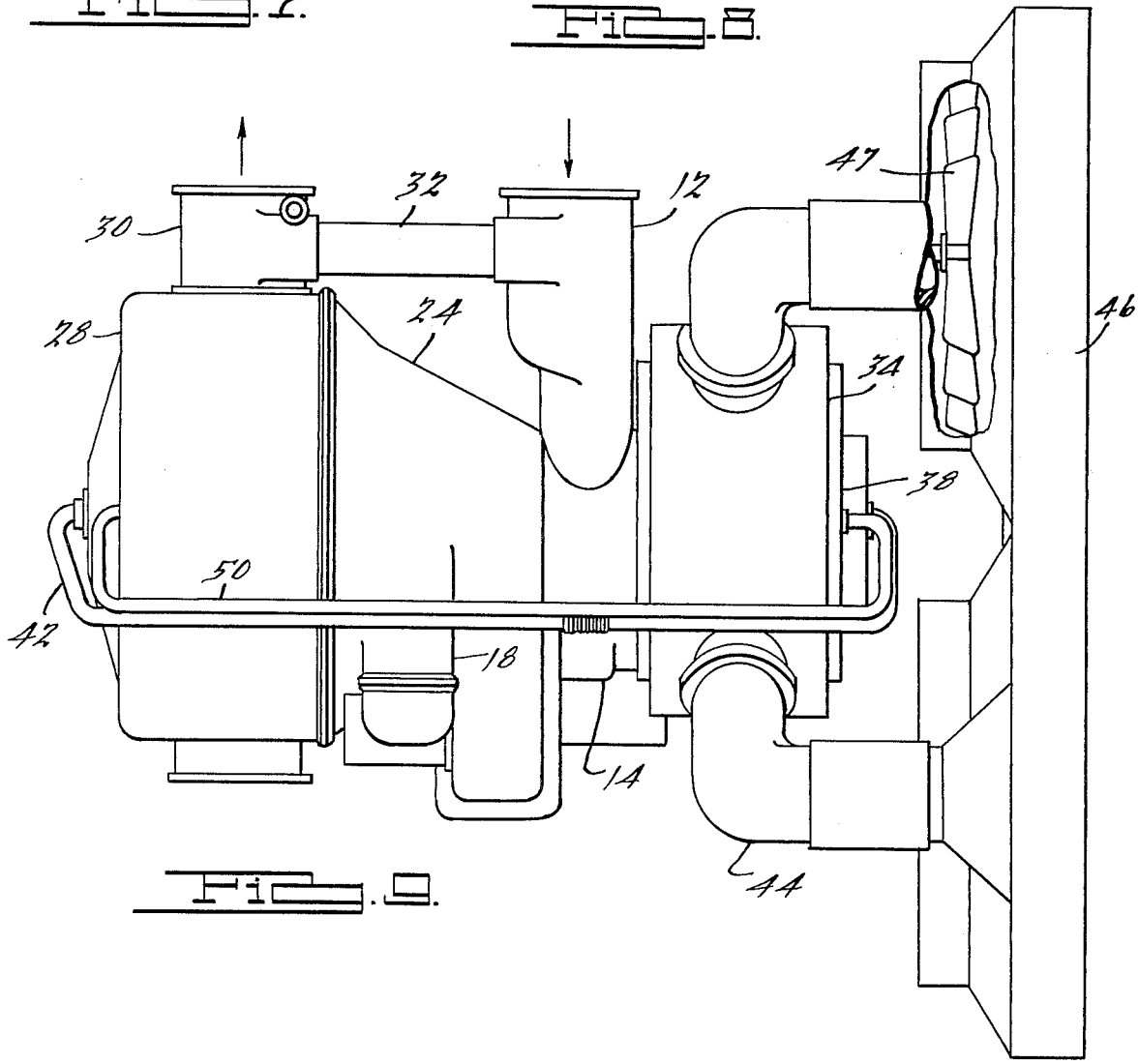

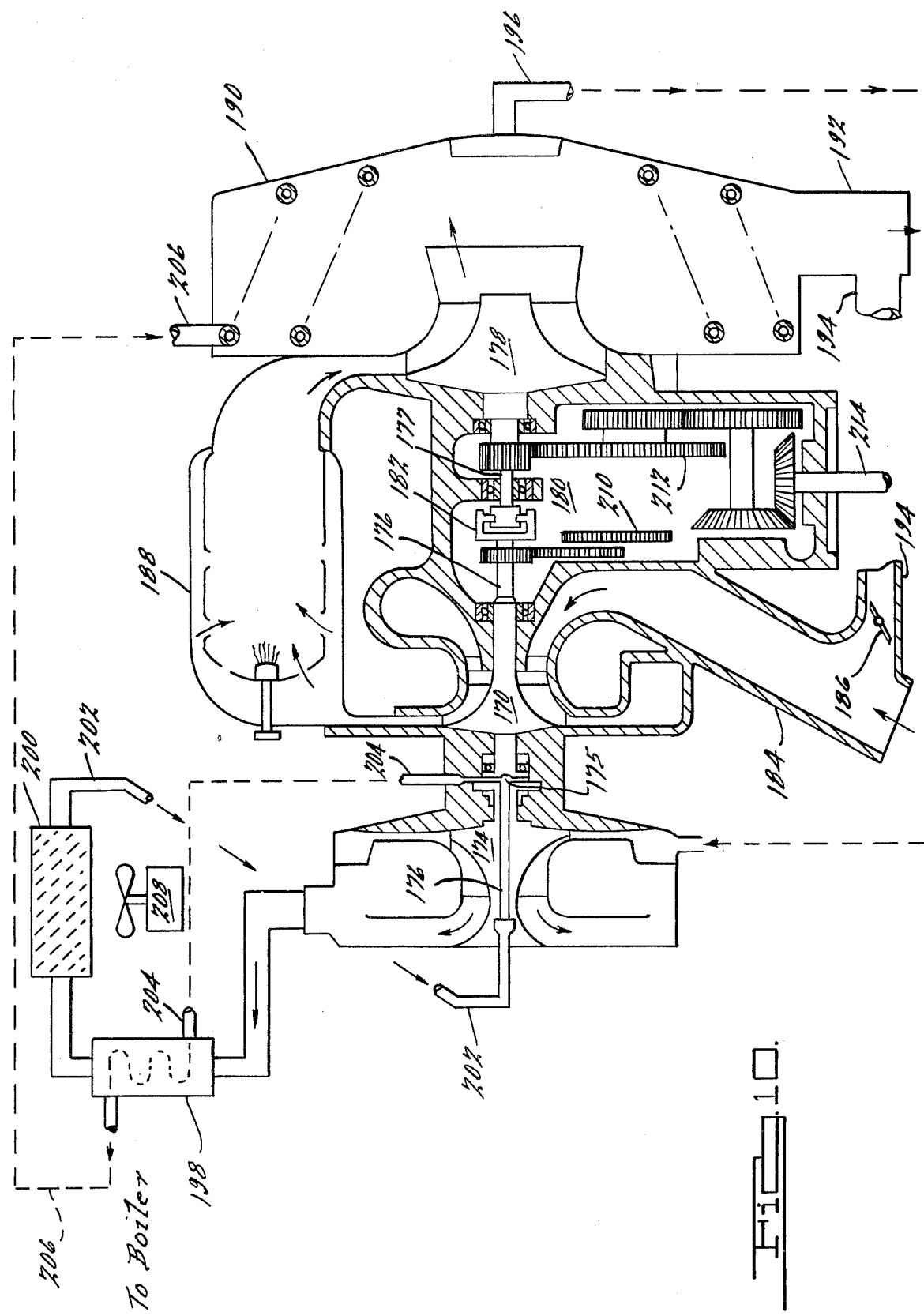

TURBINE ENGINE WITH EXHAUST GAS RECIRCULATION

BACKGROUND-SUMMARY OF THE INVENTION

This application is a continuation-in-part of application Ser. No. 706,811, filed July 19, 1976, now abandoned.

The present invention relates to gas turbines of the combined Brayton-Rankine cycle type and particularly to the integrated type in which part or all of the shaft power necessary to drive the compressor is supplied by the Rankine cycle turbine. In the operation of the inventive integrated combined cycle engine, a portion of the exhaust gas is recirculated into the compressor inlet during part-load operation. The recirculation of exhaust gas improves the efficiency of the engine at part-load over that which would occur with only ambient temperature air entering the compressor. Also, the controlled application of exhaust gas recirculation improves the dynamic response of the engine to demands for changes in power output and is predicted to reduce the emission of polluting nitrous oxides from the engine combustor.

Gas turbines are being proposed and developed today for an ever-widening variety of applications, including automotive and other vehicular applications. For these applications it is necessary for the engine to operate efficiently over a wide range of power levels and to respond rapidly to demands for changes in output torque and speed.

Conventional open cycle gas turbine and combined cycle open Brayton-closed Rankine cycle engines tend to lose efficiency when the power is reduced from the maximum levels. In order to reduce the power level of a gas turbine it is necessary to reduce the peak cycle temperature, the cycle pressure ratio, or both simultaneously. A reduction in either or both of these will result in lower thermal efficiency. Peak cycle temperature is reduced by lowering the fuel flow in relation to the engine airflow causing a smaller temperature rise in the combustor. Lower temperature gas passing through the turbine produces less work for the compressor drive turbine so that compressor speed, mass flow, and pressure ratio are reduced. If there is a sudden demand for increased power, the response of the engine is limited by the time required to overcome the compressor and turbine rotational inertia and bring the engine up to the required mass flow and pressure ratio.

The use of exhaust gas recirculation has been applied to various types of heat engines, notably the spark ignition internal combustion engine, for the purpose of reducing the formation of nitrous oxide pollutants during the combustion process. It is recognized that the presence of exhaust products in the combustion air will result in lower peak flame temperatures because of a reduced oxygen concentration. Reduced flame temperature retards the formation of oxides of nitrogen which are considered undesirable because of their contribution in the photochemical formation of smog. Exhaust gas recirculation has also been proposed for gas turbine engine for reasons other than lowering exhaust emissions. For example, Amann U.S. Pat. No. 3,785,145 discloses exhaust gas recirculation applied to a regenerative gas turbine engine during engine warm-up from a cold start to speed up the warm-up process. The heated inlet mixture helps to bring the regenerative heat exchanger up to normal operating temperature more rapidly.

Exhaust gas recirculation, however, has not heretofore been applied or proposed to be applied to a gas turbine engine in a manner to cause an improvement in thermodynamic cycle efficiency. It also has not been applied or suggested in a controlled manner to improve engine dynamic response. Accordingly, it is an object of the present invention to achieve both these results when applied to a combined Brayton-Rankine cycle engine and in particular, but not limited to, the type engine in which the Rankine cycle turbine is coupled to and supplies all or part of the power necessary to drive the compressor.

Further objects of the invention are to improve the efficiency of combined Brayton-Rankine cycle engines when operating at part power, and to improve the dynamic response to sudden demands for changes in power output. Still further objects and advantages of the invention will become apparent upon consideration of the present disclosure and the accompanying drawings.

BRIEF DESCRIPTION OF THE DRAWINGS

FIG. 3 is a graph depicting a control schedule for recirculation of exhaust gases in accordance with the present invention;

FIG. 4 is a graph illustrating operating parameters for one embodiment of the invention;

FIG. 5 is a schematic diagram of a combined engine embodiment in accordance with the present invention;

FIG. 6 is a schematic diagram of a control system for recirculation of exhaust gases;

FIGS. 7 and 8 are graphs depicting various operating parameters for an embodiment of the invention;

FIG. 9 illustrates an engine embodiment constructed in accordance with the present invention; and FIGS. 10 and 11 illustrate still further embodiments of the invention.

DESCRIPTION OF THE PREFERRED EMBODIMENTS

Figure 1:
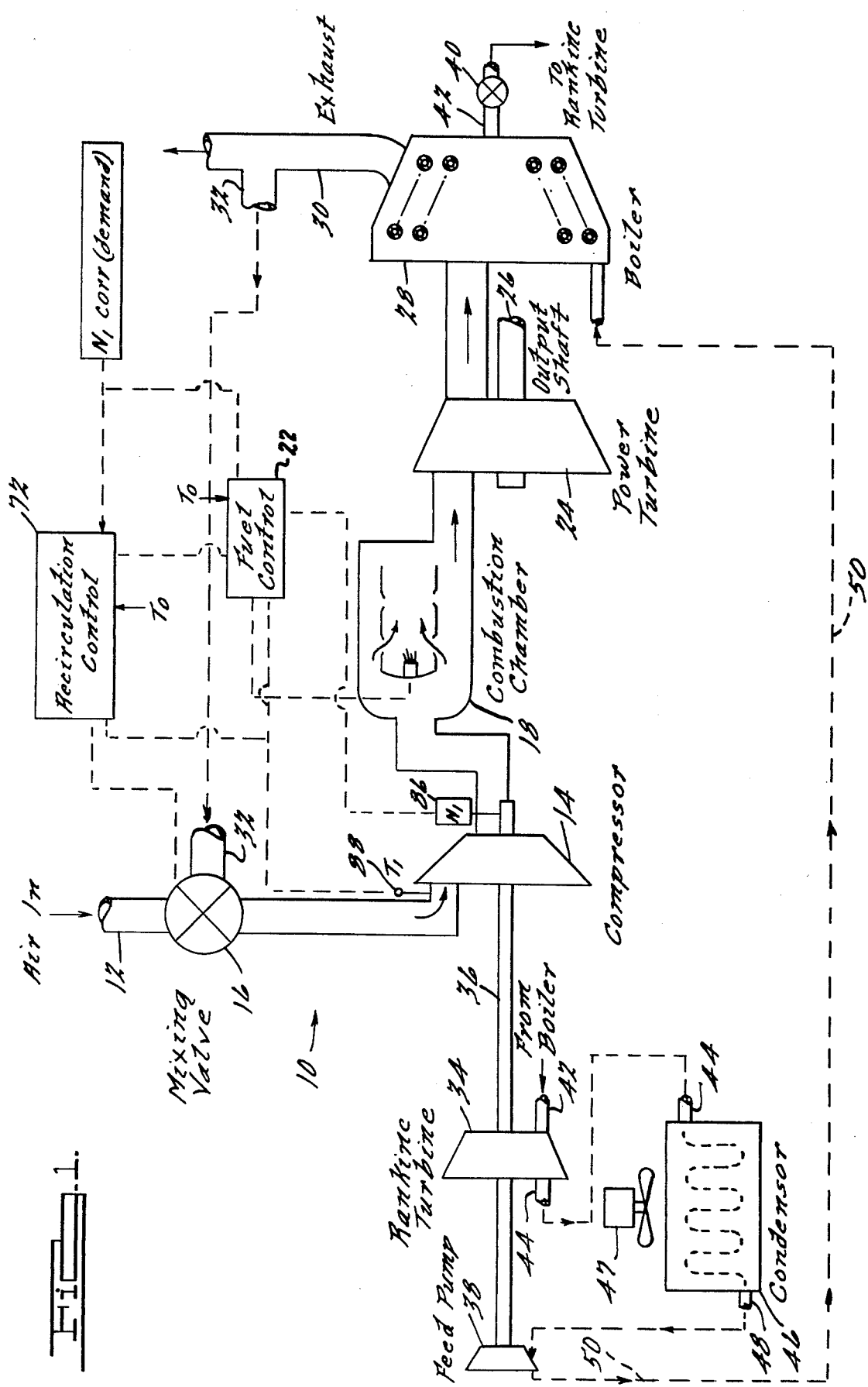
FIG. 1 is a schematic diagram of a combined Brayton cycle-Rankine cycle engine in accordance with the present invention.

Before referring to the drawings in detail, it is helpful at this time to set forth the theory behind the present invention. As explained above, high terminal efficiency is important at part load operating conditions for gas turbine engines. Normally, at reduced power levels, the thermal efficiency of such engines is lower than at maximum power - this is because the cycle pressure ratio and/or the peak cycle temperature must be reduced in order to reduce power.

A possible means of reducing engine power level is to increase the temperature of the air entering the compressor by recirculating a portion of the exhaust gases to the engine inlet. The following examples will show that this method will normally cause a reduction of efficiency when applied to various gas turbine cycles, except when applied to a combined Brayton-Rankine engine in accordance with the present invention.

The first example relates to a simple cycle gas turbine engine consisting of a compressor, combustor, and turbine. It shall be assumed that this engine is operating without exhaust gas recirculation at a part load condition. For this example, and the others following below, it shall also be assumed that the engine is operating at turbine inlet temperatures reduced from the maximum allowable and that the rotor speed is increased as required to maintain the desired pressure ratio and mass flow. In order to simplify the examples, the small heat losses through the engine housings and due to bearing friction and the like will be neglected. The small flow path pressure losses, such as those in the combustor and exhaust systems, also will be neglected.

The following thermodynamic properties are assumed for air and the products of combustion:

|  | Air | Products |
|---|---|---|
| Specific Heat | $Cp_a = .25$ | $Cp_p = .275$ |
| Specific Heat Ratio | $\gamma_a = 1.39$ | $\gamma_p = 1.33$ |

The following variables are defined:
Ambient temperature $T_o$
Compressor inlet temp. $T_1$
Turbine inlet temp. $T_5$
Turbine exit temp. $T_6$
Pressure ratio P.R.
Compressor efficiency $\eta_c$
Turbine efficiency $\eta_t$
The following values will be assumed:
Ambient temp. $T_o = 520°$ R
Compressor and Turbine eff. $\eta_c = \eta_t = .85$
Pressure ratio P.R. $= 8$
The following equations define the engine operating cycle.
Compressor Exit Temperature:

$$T_2 = T_1 \left[ \frac{P.R.^{(\gamma-1)/\gamma} - 1}{\eta_c} + 1 \right] \quad (1)$$

Compressor work:

$$\text{Comp. Work} = (T_2 - T_1)Cp_a \quad (2)$$

Turbine Exit Temperature:

$$T_6 = T_5[1 - (1 - P.R.^{(1-\gamma)/\gamma})\eta_t] \quad$$

Turbine Work:

$$\text{Turb. Work} = (T_5 - T_6)Cp_p \quad (4)$$

$$\text{Net Work} = \text{Turb Work} - \text{Comp Work} \quad (5)$$

Exhaust Gas Recirculation Fraction:

$$EGR = \frac{T_1 - T_0}{T_6 - T_0} \quad (6)$$

Engine Heat Rejection:

$$Q_{rej} = (T_6 - T_0)Cp_p(1 - EGR) \quad (7)$$

Engine Thermal Efficiency:

$$\text{Eff.} = \frac{\text{Net Work}}{\text{Net Work} + Q_{rej}} \quad (8)$$

Before the exhaust gas recirculation is applied, it will be assumed that ambient temperature air is entering the compressor ($T_a = T_1$), and that the turbine inlet temperature $T_5$ is 2000° R. Next, sufficient exhaust products will be recirculated to raise the inlet temperature $T_1$ to 700° R and increase the turbine inlet temperature as required to maintain constant net work. Only that portion of exhaust gas not recirculated will be considered as rejecting heat from the cycle by Equation (7). The rotor speeds are adjusted as required to maintain constant cycle pressure ratio and mass flow. The following Table I defines the cycle characteristics as computed by Equation (1)–(8) for this engine operating with only ambient air entering the compressor (W/O EGR), and with exhaust gas recirculation (with EGR).

TABLE I

| | Simple Cycle Gas Turbine | |
|---|---|---|
| | W/O EGR | With EGR |
| $T^1$ (° R) | 520 | 520 |
| $T_1$ (° R) | 520 | 700 |
| $T_2$ (° R) | 1004.8 | 1352.4 |
| $T_5$ (° R) | 2000 | 2445 |
| $T_6$ (° R) | 1314.8 | 1607.4 |
| Comp. Work BTU/lb | 121.15 | 163.09 |
| Turb. Work BTU/lb | 188.43 | 230.38 |
| Net Work BTU/lb | 67.28 | 67.28 |
| EGR | 0 | .166 |
| $Q_{rej}$ | 218.6 | 249.5 |
| Efficiency | .2354 | .2124 |

As may be seen from Table I, the application of exhaust gas recirculation results in a lower cycle efficiency in a simple cycle gas turbine in spite of the fact that the peak cycle temperature ($T_5$) is greater.

A second example will consider a regenerative cycle gas turbine operating under the same conditions as in the first example. The regenerative cycle utilizes a heat exchanger to recover some of the heat energy of the gases leaving the turbine and transfers that energy to the lower temperature gases leaving the compressor. The pressure ratio of this engine will be assumed to be 4:1 which is typical of vehicular engines of this cycle.

Additional parameters defined:
Temp. of high pressure air leaving regenerator $T_3$
Temp. of low pressure products leaving regenerator $T_e$
Regenerator effectivness $\epsilon$ The following additional equations are utilized: Regenerator Effectiveness Defined:

$$\epsilon = \frac{T_3 - T_2}{T_6 - T_2}$$

$$T_3 = T_2 + \epsilon(T_6 - T_2) \quad (9)$$

Regenerator Heat Balance: $(T_6 - T_e)Cp_p = (T_3 - T_2)Cp_a$ $$T_e = T_6 - \frac{Cp_a}{Cp_p}(T_3 - T_2) \quad (10)$$

Equations (6) and (7) are redefined as follows:

$$EGR = \frac{T_1 - T_0}{T_3 - T_0} \quad (6)'$$

$$Q_{rej} = (T_e - T_0)C_{pp}(1 - EGR) \quad (7')$$

A regenerator effectiveness of 0.9 is assumed. As in the first example, the cycle characteristics have been examined assuming: that only ambient air is entering the compressor; and the next that the compressor inlet air temperature is raised to 700° R by exhaust gas recirculation. The computed cycle performance is presented in Table II.

TABLE II

| Regenerative Cycle Gas Turbine | | |
|---|---|---|
| | W/O ERG | With EGR |
| $T_o$(° R) | 520 | 520 |
| $T_1$(° R) | 520 | 700 |
| $T_2$(° R) | 810.9 | 1091.5 |
| $T_3$(° R) | 1435.8 | 1714.3 |
| $T_5$(° R) | 2000 | 2370 |
| $T_6$(° R) | 1505.2 | 1783.5 |
| $T_e$(° R) | 937.1 | 1217.3 |
| Comp. Work BTU/lb | 72.72 | 97.88 |
| Turb. Work BTU/lb | 136.07 | 161.23 |
| Net Work BTU/lb | 63.35 | 63.35 |
| EGR | 0 | .258 |
| $Q_{rej}$ | 114.7 | 142.3 |
| Efficiency | .3558 | .3081 |

As in the case of the simple cycle engine, the regenerative gas turbine also exhibits lower thermal efficiency when operating with exhaust gas recirculation.

The two above examples show that the use of exhaust gas recirculation on open cycle Brayton engines is detrimental to thermal efficiency. Although the cycles examined were somewhat simplified from those of real engines, and that other variations of gas turbine cycles may exist, the relative results predicted by these examples will hold for real gas turbines as well.

The present invention utilizes exhaust gas recirculation in a combined Brayton-Rankine cycle engine for the purpose of improving thermal efficiency. An example will demonstrate its effectiveness. In this example, an open Brayton cycle consisting of a compressor, combustor, and turbine is utilized. The gases leaving the Brayton turbine are passed through a heat exchanger (boiler) before being released to the atmosphere or recirculated to the compressor inlet. The heat input to the boiler is used to vaporize a fluid under high pressure which is circulated in a closed loop Rankine cycle. The Rankine cycle loop consists of a boiler, turbine, condenser, feed pump, and suitable controls. It may also include a regenerative heat exchanger within the loop. It will be assumed that the Brayton cycle is operating at an 8:1 pressure ratio, as in the first example above, and that the same assumptions are made relative to losses and component efficiencies. It will also be assumed that the boiler heat exchanger operates at an effectiveness of 0.9. Without examining the details of the operation of the closed Rankine cycle, it may be assumed that 27% of the heat energy transferred to the boiler can be converted to useful work, and that the remainder of that energy is rejected via the condenser. This is a reasonable Rankine cycle efficiency for a well designed system operating at the temperatures cited in this example. It will also be assumed that the Rankine fluid enters the boiler at 700° R. This temperature leaves sufficient margin above ambient of 520° R. to allow for heat transfer from the condenser to the environment and for a small temperature rise across the feed pump and, if desired, a Rankine regenerator.

The following additional parameters are defined:
Temp. of Rankine fluid entering the boiler $T_{R2}$
Boiler effectiveness $$\epsilon = \frac{T_6 - T_e}{T_6 \cdot T_{R2}}$$

Rankine cycle efficiency $\eta_R$
The following additional equations are utilized:
Temp. of Products leaving the boiler:

$$T_e = T_6 - \epsilon(T_6 - T_{R2}) \quad (11)$$

Heat transferred to the boiler:

$$Q_{boil} = (T_6 - T_e)C_P \quad (12)$$

Rankine cycle work:

$$\text{Rank. Work} = \eta_R Q_{boil} \quad (13)$$

Net Engine Work:

$$\text{Net Work} = (\text{Bray.Turb.Work}) + (\text{Rank.Work}) - (\text{Comp.Work}) \quad (14)$$

Rankine cycle heat rejected:

$$\text{Rank.}Q_{rej} = (1 - \eta_R)Q_{boil} \quad (15)$$

Brayton Heat Rejected: EQ #7
Total heat rejected = Rank. $Q_{rej}$ + Bray.$Q_{rej}$ Based on Equations (1)-(8) and (10)-(15), the cycle characteristics for a combined cycle engine operating with ambient air entering the compressor and with air plus exhaust gases at a 700° R. mix temperature are presented in Table III.

TABLE III

| Combined Brayton-Rankine Cycle Engine | | |
|---|---|---|
| | W/O EGR | WITH EGR |
| $T_o$(° R) | 520 | 520 |
| $T_1$(° R) | 520 | 700 |
| $T_2$(° R) | 1004.6 | 1352.4 |
| $T_5$(° R) | 2000 | 2305 |
| $T_6$(° R) | 1314.8 | 1515.3 |
| $T_e$(° R) | 761.5 | 781.5 |
| Comp. Work (BTU/lb) | 121.15 | 163.1 |
| Bray. Turb. Work (BTU/lb) | 188.43 | 217.17 |
| Rank. Work (BTU/lb) | 41.08 | 54.48 |
| Net Work (BTU/lb) | 108.36 | 108.36 |
| EGR | 0 | .688 |
| Bray. $Q_{rej}$ (BTU/lb) | 66.41 | 22.42 |
| Rank. $Q_{rej}$ (BTU/lb) | 111.1 | 147.3 |
| Total $Q_{rej}$ (BTU/lb) | 177.5 | 169.7 |
| Efficiency | .379 | .390 |

Table III shows that the efficiency of the combined cycle engine is improved by approximately 3% by the application of exhaust gas recirculation. The actual efficiency gains from exhaust gas recirculation in real engines is dependent on many factors and, under some conditions, may be greater than in this example. It is understood that this example was simplified for the purpose of illustration, but that the results are characteristic of what would be achieved from a real engine. The results of a more detailed cycle analysis are presented below.

Referring now to the drawings, the basic component of the engine and control system are shown in FIG. 1, the engine being designated generally by the numeral 10. Air enters the engine 10 through the inlet duct 12 and is raised to a pressure of several atmospheres by the compressor 14. A mixing valve 16 is positioned in the inlet duct 12 and controls the recirculation of a portion of the exhaust gases into the engine 10 in a manner to be described below.

From the compressor, the high pressure air enters the combustion chamber 18 where fuel is added and ignited to raise the temperature of the air. The fuel is added by means of a conventional fuel feed mechanism (not shown) which is controlled by a fuel control 22 also to be described below. The combustion products are expanded through the main power turbine 24 which is coupled to the load (not shown) via power output shaft 26. Heat from the turbine exhaust gases is used to power the heat exchanger (boiler) 28 of a closed-loop Rankine cycle using an organic working fluid. The products of combustion passing through the boiler 28 are exhausted from the engine through outlet duct 30. A portion of the exhaust gases is recirculated by means of duct 32 to the mixing valve 16.

The fluid in the Rankine system, which preferably is toluene, pyridine, or a similar organic fluid, is vaporized in the boiler 28 and is used to drive a Rankine turbine 34. The Rankine turbine 34 and the compressor 14 of the open-loop Brayton cycle have their rotors on a common shaft 36 and the work produced by the Rankine turbine 34 drives the compressor 14. The shaft 36 extends through and beyond the turbine 34 to drive the centrifugal feed pump 38. The shaft 36 also is adapted to drive gearing in a suitable gearbox (not shown) which is used to drive a number of accessories on the engine 10, such as a variable speed drive cooling fan 47.

The Rankine turbine 34 draws its vapor from the heat exchanger 28. The heat exchanger 28 is incorporated in the outlet (exhaust) passageway of the engine 10 and preferably is constructed in accordance with U.S. Pat. No. 3,874,345, although it can be of any conventional construction and configuration. In accordance with that patent, the intercycle heat exchanger 28 has an annular core consisting of parallel multiple path small diameter tubes of the same length arranged in concentric helical coils such that the fluid flow progresses from the outermost coil inward while the exhaust gases flow radially outward. A thermostatic throttle valve 40 is positioned in the conduit 42 which flows the vaporized gas from the heat exchanger 28 to the turbine 34. The valve 40 operates in a manner which is described below.

From the turbine 34, the low pressure working medium is still in vapor form and passes via conduit 44 through a condenser 46 where it is cooled and liquified. The cooling of the condenser 46 is assisted by the fan 47. From the condenser 46, the liquified Rankine fluid is delivered by conduit 48 to the feed pump 38 which in turn delivers the liquid to the heat exchanger 28 via conduit 50 for vaporization in the heat exchanger, as will be understood. It is also possible to position a counterflow regenerator into the path of the working medium between the Rankine turbine 34 and the condenser 46. The regenerator helps increase the efficiency of the Rankine cycle.

The power level of the combined cycle engine 10 is controlled by modulating the fuel flow to combustion chamber 18. The fuel flow is modulated by fuel control 22.

A portion of the exhaust gases passing from the power turbine 24 and boiler 28 are recirculated into the engine 10 by an interconnecting duct 32 between exhaust duct 30 and mixing valve 16 which is positioned upstream of the compressor 14. In a normal engine installation, the inlet to the compressor 12 is at a lower pressure than the exhaust because of inlet and exhaust duct losses. As a result, the exhaust gases will mix with the inlet air whenever the mixing valve 16 is opened. As will be discussed in more detail below, the mixing valve is modulated in a prespecified manner to control the rate of recirculation.

It is desired to recirculate a portion of exhaust gases at all steady state operating points of the engine below a specified power level. The percentage of recirculation is to be varied in an inverse relationship to the engine fuel flow in order to assure sufficient air is proportioned into the gas mixture entering the combustor to provide adequate oxygen for efficient combustion. At low power levels and low fuel flows, a gas turbine normally operates at fuel/air ratios providing a large excess of oxygen. It is therefore possible to recirculate 60% or more of the exhaust products at engine idle with adequate oxygen availability. At high power settings this percentage must be reduced to prevent incomplete combustion. While it is desired to maintain a high level of recirculation at part load steady state operating conditions to maximize engine efficiency, it is beneficial to reduce or eliminate recirculation during engine acceleration transients in order to permit maximum increase in air mass flow, fuel mass flow, and engine response.

Many arrangements of control systems and mechanisms may be utilized to achieve the desired objectives of control of recirculation as defined by the present invention. Since the fuel flow and recirculation are related, systems controlling these features are preferred for purposes of the present invention. Also, as is understood in the art, the functions of the various control elements may be accomplished hydro-mechanically, pneumatically or electronically. For example, hydromechanical and electronic control systems for gas turbine aircraft engines are disclosed in the Society of Automotive Engineers article SAE 740,380, dated Apr. 2–5, 1974, electronic fuel controls for gas turbine engines are disclosed in the Society of Automotive Engineers article SAE 751061, dated Nov. 17–20, 1975, and another type of fuel control system for a gas turbine engine is disclosed in the American Society of Mechanical Engineers article ASME 74-GT-142, dated 1974.

Figure 2:
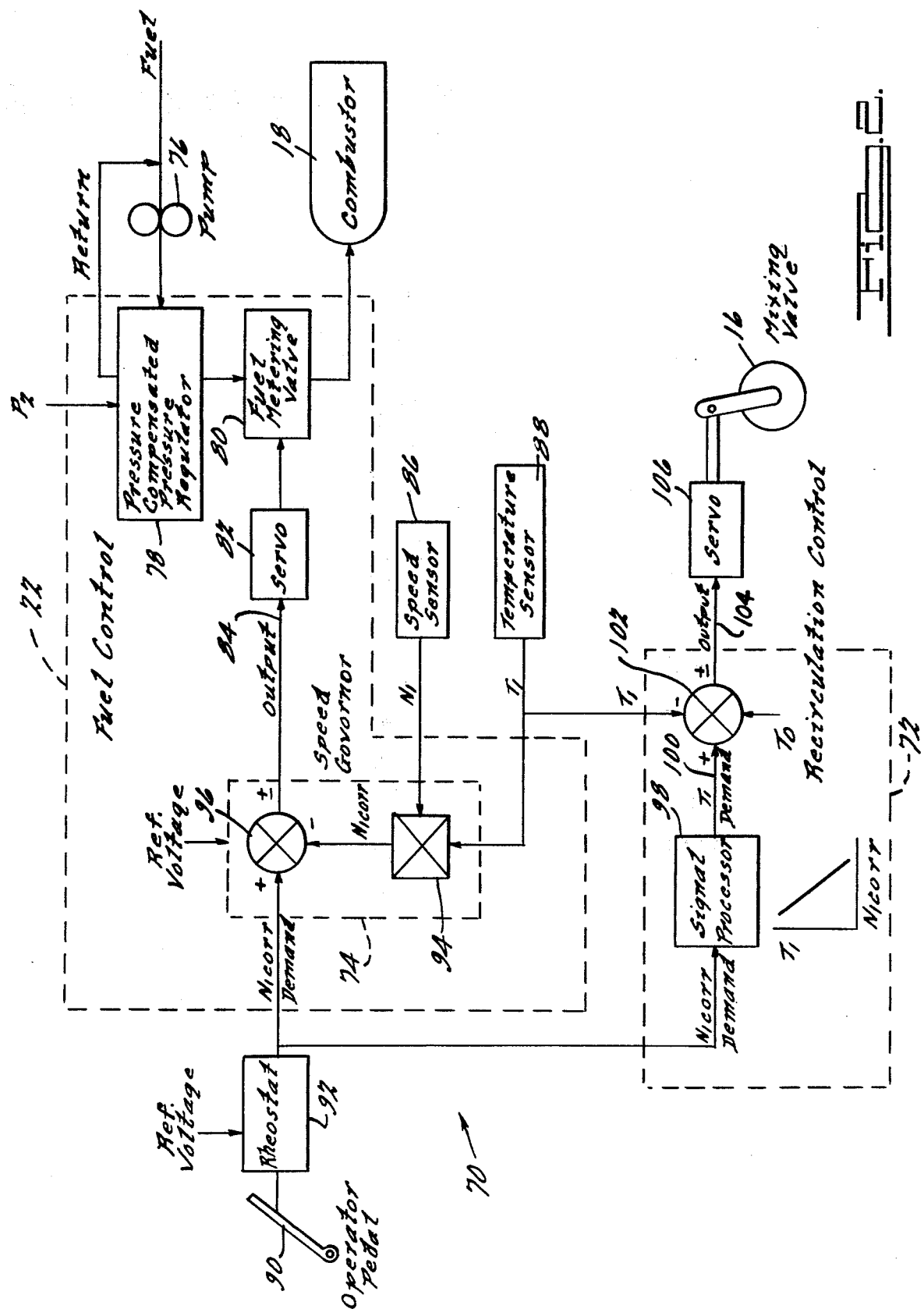
FIG. 2 is a schematic diagram of a control system for fuel and recirculation of exhaust gases.

A schematic diagram of the fuel control and recirculation control for the engine 10 is shown in FIG. 2. Only those elements of fuel control are shown which are necessary to explain the functioning of the recirculation control. It will be understood that additional fuel control features for start sequencing, overtemperature control, and safety emergency shut down can be present as required. Also, it is preferred that the data processing components of the controls be electronic in accordance with the preferred embodiment of the invention.

There are two primary control loops within the control mechanism 70, namely the fuel control 22 and a recirculation control 72. The fuel control 22 controls the flow of fuel to the combustor 18 and the recirculation control 72 controls the mixing of the ambient air and exhaust gases in the mixing valve 16.

A gas generator speed governor 74 modulates the fuel flow. Fuel is supplied to the control 22 by a positive displacement pump 76. The pump 76 can be of any conventional type, such as the gear-type pump shown schematically in FIG. 2. The fuel pressure is controlled by a pressure compensated pressure regulator 78 which bypasses excess flow. The regulator 78 is compensated to compressor discharge pressure ($P_2$). A fuel metering value 80 is servo driven by a servo motor 82 from the output 84 of the speed governor 74.

Other than the compressor discharge pressure ($P_2$) the input parameters to the fuel control 22 include the gas generator rotor speed ($N_1$), the compressor inlet temperature ($T_1$), and the demand corrected gas generator speed ($N_{1corr}$[demand]). Electromagnetic sensor 86 positioned adjacent the shaft 36 measures $N_1$ and thermocouple sensor 88 located in the inlet to the compressor 14 measures $T_1$. A pedal 90 or power lever is controlled by the engine operator. The pedal position is sensed by a rheostat 92 which generates a signal designed $N_{1corr}$(demand). The latter signal thus is a function of pedal position and is used as one of the basic control parameters for the speed governor 74.

To compensate for variations in the inlet temperature $T_1$ of the compressor 14, the governed speed $N_1$ is corrected. It is corrected electronically in signal processor 94 in accordance with the following equation:

$$N_{1corr} = N_1 / \sqrt{T_1/T_{standard}}$$

where $T_{std}$ is a predetermined temperature calculated to correct for changes in ambient temperature. Typically $T_{std}$ is 59.6° F.

$N_{1corr}$ and $N_{1corr}$ (demand) are normalized to a reference voltage and summed at summing point 96 to produce output 84 from governor 74:

$$N_{1corr} - N_{1corr}(\text{demand}) = \text{output}$$

The governor 74 drives the metering valve servo 82 to increase or decrease fuel flow in order to match $N_{1corr}$ to $N_{1corr}$ (demand). This type of fuel control provides predictable relationships between the operator input, pedal position, fuel flow and engine power level. Engine pressure ratio and mass flow are direct functions of gas generator corrected speed ($N_{1corr}$). For each value of corrected speed there is a discrete fuel flow value required to provide energy to drive the compressor 14 via the Rankine cycle. Changes in power turbine speed will have only secondary effects on the fuel flow/$N_{1corr}$ relationship. These secondary effects are the result of minor changes in cycle mass flow and turbine exit temperature resulting from variations in turbine efficiency.

The fuel flow/$N_{1corr}$ relationship is used in the exhaust gas recirculation control 72. By a computer analysis of the engine cycle operating over a full envelope of speeds and power levels, it is possible to identify a schedule of recirculation vs. fuel flow which will provide a maximum recirculation within the limits of overall fuel/air ratio for efficient combustion. For a given ambient temperature $T_0$ and fuel flow there will be a discrete value of the recirculated exhaust temperature $T_e$. From Equation (6) it may be seen that ($T_1 - T_0$) is therefore a function of EGR (percent exhaust gas recirculation). The recirculation vs. fuel flow is redefined as a ($T_1 - T_0$) vs. $N_{1corr}$ relationship. An optimum ($T_1 - T_0$)/$N_{1corr}$ schedule may, therefore, be defined and programed into an electronic control that will be used for modulating the recirculation mixing valve. FIG. 3 shows a ($T_1 - T_0$)/$N_{1corr}$ schedule for an integrated combined cycle engine. From idle up to 90% of the corrected speed ($N_{1corr}$[demand]), a linear schedule is selected which will provide a near-constant overall fuel-air ratio. From 90% to 100%, the slope of the schedule curve is increased to prevent excessive turbine inlet temperature and provide zero recirculation at maximum speed. FIG. 4 shows the fuel/air ratio and the percent of exhaust gas recirculation based on such a control schedule.

The recirculation control mechanism 72 is shown in block diagram in FIG. 2. Inputs to the control 72 are $N_{1corr}$ (demand), $T_0$ and $T_1$. These inputs are received from the same sensors used for the fuel control mechanism 22. The recirculation control loop is closed by the $T_1$ parameter. The $N_{1corr}$ (demand) signal is processed electronically in signal processor 98 by the programed $T_1$ vs. $N_{1corr}$, $T_0$ (demand) schedule to produce a $T_1$ (demand) output signal 100. The $T_1$ (demand) is summed algebraically at summing point 102 with $T_1$:

$$T_1 (\text{demand}) - T_1 = \text{output}$$

The output signal 104 from control 72 drives the recirculation mixing valve 16, through a servo motor 106. When $T_1$ (demand) exceeds $T_1$, the valve is driven open to increase recirculation flow and vice versa. The magnitude of the output signal is proportional to the error. The servo 106 is therefore driven at a rate proportional to the error signal.

During steady state operation the rate of recirculation is linked by the control logic to the fuel flow by the $N_{1corr}$ (demand) which equals the measured $N_{1corr}$. However, because the demand $N_{1corr}$ is used as an input to the recirculation control mechanism 72, this control can anticipate changes in engine power. The control will, therefore, act to reduce or eliminate recirculation during engine acceleration as set forth in the specification. The response rate (fuel flow vs. time) of the fuel control mechanism 22 will normally be specified to prevent turbine overtemperature and/or compressor surge during engine accelerations and to prevent lean combustor flame-out during decelerations. In normal engine control designs, this rate will be a function of the gas generator rotor inertia and the magnitude of the required rotor speed change. The greater the inertia and speed change required, the slower the response will be. In the present invention, the recirculation control can effect a change in the corrected speed by changing $T_1$, without a change in the physical speed. The rotor inertia is not a factor in this change. The permissible rate of change of fuel flow by the fuel control can therefore be greater than in conventional designs and engine dynamic response will be improved.

The control system described above is predicted to achieve the objectives of the invention of improving part load engine efficiency and engine dynamic response through the control of recirculation of exhaust gases. It is understood that additional components and control functions could be included in this control arrangement to meet specific engine application requirements and operating environments.

In addition to improved efficiency and response, there are several additional benefits derived from the controlled application of exhaust gas recirculation in a combined cycle application.

First of all, the use of recirculation is predicted to reduce undesirable exhaust emissions. The presence of exhaust products in the combustion air lowers the oxygen concentration which in turn will limit the peak flame temperatures reached in the fuel rich zones of the engine combustor. The formation of nitros oxides normally takes place in these zones at an exponential rate function of temperature. The reduction of peak flame temperature will therefore result in reduced nitros oxides formation and lower emissions.

At very low power levels and idle, incomplete combustion and exhaust emissions often occur because of poor fuel vaporization. Under these conditions exhaust gas recirculation may be beneficial in increasing the combustor inlet temperature to enhance fuel vaporization.

A second additional benefit derived from controlled exhaust gas recirculation is an improved speed match between compressor and Rankine turbine. In a conventional open loop Brayton cycle, the pressure ratio varies more than that of the closed loop Rankine cycle. In the Rankine cycle both the turbine inlet and turbine exit pressure drop with decreasing mass flow as a result of improved condenser performance at low power level. Optimum speed is a function of pressure ratio. Therefore, there is a mismatch between the optimum Rankine turbine and Brayton compressor speed at part load. The use of recirculation raises the compressor speed and improves the speed match resulting in improved turbine efficiency.

A third additional advantage of EGR is derived from the reduction of air flow and exhaust flow through the inlet and exhaust systems, respectively. In many applications it is necessary to remove particulate matter from the inlet air by filtration or separation. By reducing inlet air flow, the required maintenance and service of the filtration system may be reduced. In applications where it is permissible to accept a small performance penalty at maximum power levels, the size and weight of both inlet and exhaust systems might be reduced in accordance with reduction in net flow occuring at part load as a result of EGR.

As a further illustration of the effect of exhaust gas recirculation, a detailed engine analysis was conducted. To examine the effect of recirculation, the engine was analyzed at maximum power (100%), at 50% power without recirculation, and at 50% power with recirculation. A maximum Brayton cycle temperature of 1800° F. was assumed, as was a maximum Rankine cycle temperature of 700° F. Component efficiencies and system losses were predicted based on present knowledge of small Brayton and Rankine cycle engines. The significant cycle state points, mass flows and component data for each of the three operating points is presented in the following Table:

TABLE IV

|  | 100% Power | 50% Power without EGR | 50% Power with EGR |
|---|---|---|---|
| Brayton Cycle Temp. (°F.) | | | |
| Ambient | 59 | 59 | 59 |
| Compressor Inlet | 59 | 59 | 184 |
| Combustor Inlet | 347 | 269 | 421 |
| Turbine Inlet | 1800 | 1360 | 1435 |
| Boiler Inlet | 1311 | 1034 | 1124 |
| Exhaust | 263 | 235 | 240 |
| Brayton Cycle Press. (Psia) | | | |
| Ambient | 14.7 | 14.7 | 14.7 |
| Compressor Inlet | 14.6 | 14.6 | 14.7 |
| Combustor Inlet | 52.9 | 39.1 | 37.9 |
| Turbine Inlet | 51.3 | 37.9 | 36.8 |
| Boiler Inlet | 15.3 | 15.0 | 15.0 |
| Exhaust | 14.9 | 14.8 | 14.8 |
| Rankine Cycle Temp. (°F.) | | | |
| Turbine Inlet | 700 | 700 | 700 |
| Condenser Inlet | 397 | 418 | 407 |
| Feed Pump Inlet | 158 | 127 | 132 |
| Boiler Inlet | 163 | 131 | 136 |
| Rankine Cycle Press. (Psia) | | | |
| Turbine Inlet | 696 | 389 | 434 |
| Condenser Inlet | 3.43 | 1.88 | 2.06 |
| Feed Pump Inlet | 3.19 | 1.78 | 1.92 |
| Boiler Inlet | 750 | 547 | 650 |
| Componet Adiabatic Efficiencies | | | |
| Compressor | .80 | .80 | .80 |
| Combustor | .99 | .99 | .99 |
| Power Turbine | .866 | .871 | .871 |
| Rankine Turbine | .849 | .825 | .844 |
| Feed Pump | .5 | .5 | .5 |
| Heat Exchanger Effectiveness | | | |
| Boiler | .918 | .890 | .901 |
| Condenser | .914 | .916 | .916 |
| Air Mass Flow (LB/SEC) | .987 | .785 | .236 |
| Recirculation Mass Flow (LB/SEC) | 0 | 0 | .507 |
| Rankine Fluid Mass Flow (LB/SEC) | .736 | .405 | .452 |
| Fuel Mass Flow (LB/SEC) | .0222 | .0126 | .0119 |
| Compressor H.P. | 97.2 | 56.3 | 63.2 |
| Rankine Turbine H.P. | 103.9 | 59.4 | 67.3 |
| Feed Pump & Accessory H.P. | 6.7 | 3.1 | 4.1 |
| Net Engine H.P. (Power Turbine) | 200.0 | 100.0 | 100.0 |

TABLE IV-continued

|  | 100% Power | 50% Power without EGR | 50% Power with EGR |
|---|---|---|---|
| Specific Fuel Consumption (LBS/H.P.HR) | .398 | .452 | .425 |
| Thermal Efficiency | .347 | .306 | .326 |

As shown by the above data, the air mass flow, the fuel mass flow and the specific fuel consumption are all lower where exhaust gas recirculation is utilized at partial loads. Specifically, at 50% power load, approximately 6-½% fuel savings is achieved. Moreover, a higher thermal efficiency is achieved with exhaust gas recirculation than without it.

Another embodiment of the invention is depicted by FIGS. 5–8. The elements which are the same as those described earlier are numbered the same. As in the above embodiment, the power level of the combined engine 10 is controlled by varying the fuel flow to the combustion chamber 18 and this is controlled and varied by fuel control mechanism 122. The control 122 increases or decreases the level of fuel flow in Chamber 18 via fuel feed 120 in response to the operator's demand for more or less engine output power or speed. A heat sensor 152 positioned at the exhaust of the combustion chamber 18 measures the turbine inlet temperature ($T_5$). Electro-magnetic rotation sensor 154 measures the speed ($N_p$) of the power turbine 24. The fuel control 122 responds to the input information from sensors 152 and 154 to maintain the turbine temperature between prespecified minimum and maximum allowable temperatures. In this regard, an acceptable range for the turbine temperature is 1300° F. to 1800° F. The upper limit is established by typical metalurgical considerations and the lower limit is set so that there will be adequate heat remaining in the turbine exhaust to drive the compressor 14 by means of the Rankine cycle at least at half speed.

A portion of the exhaust gases passing from the power turbine 24 and boiler 28 are recirculated into the engine 10 by the interconnecting duct 32 between the exhaust duct 30 and the mixing valve 16 which is positioned upstream of the compressor 14. Since the inlet 12 to the compressor is at a lower pressure than the exhaust because of inlet and exhaust duct losses, the exhaust gases will mix with the inlet air whenever the mixing valve 16 is opened. As will be discussed below, the mixing valve 16 is modulated in a prespecified manner to control the rate of recirculation.

A schematic diagram of the control system for the engine 10 is shown in more detail in FIG. 6. The external input function to the fuel control 122 is provided by the operator who controls the power level position indicated by the numeral 156. The power level is adjusted by any appropriate means, such as a throttle, accelerator pedal, or the like. As explained above, the turbine inlet temperature $T_5$ and power turbine speed $N_p$ are measured by sensors 152 and 154, respectively, and this information is also fed into the fuel control 122 as input signals. If desired, it is also possible to compute the turbine inlet temperature $T_5$ from the cycle pressure and the turbine exit temperature. The fuel control 122 apportions fuel to the burner 18 as a function of the power level position 156, in a similar manner to that described above with reference to FIGS. 1 and 2. In the same manner as the $T_5$ input is used to limit the turbine inlet temperature to a predetermined maximum, the $N_p$ input is used to limit the power turbine speed to a predetermined maximum. The fuel control 122 will limit the fuel flow as either $T_5$ or $N_p$ limits are approached, and shut off the fuel flow if $T_5$ or $N_p$ limits are exceeded by prespecified safety margins.

The recirculation of exhaust gases is apportioned by the mixing valve 16 which in this embodiment is actuated by mixing control 158. The input signals to the mixing control 158 are the ambient inlet air temperature $T_o$, the mixed gas compressor inlet temperature $T_1$, and the turbine inlet temperature $T_5$. The inlet air temperature $T_0$ is measured by a heat sensor 160 positioned in the inlet duct 12. The mixed gas temperature $T_1$ is measured by sensor 88 positioned in the inlet duct to the compressor 14. The turbine inlet temperature $T_5$ is measured by the sensor 152, as described above.

The schematic diagram shown in FIG. 6 only shows the basic elements of the control system for the Brayton cycle. Additional control logic would also be incorporated into these basic elements for engine start-up and shut-down, idle and acceleration transients, as is common in control of conventional gas turbine engines.

The algebraic difference between $T_1$ and $T_o$ is deduced at summing point 162 and fed into the mixing control 158. A signal processor (not shown) in the mixing control 158 electronically calculates $(T_1 - T_o)$ as a function of the turbine inlet temperature ($T_5$). The schedule of $(T_1 - T_o)$ versus $T_5$ preferably has three stages, and the preferred form thereof is shown graphically in FIG. 7. In FIG. 7, $(T_1 - T_o)$ measured in degrees Farenheit (° F.) is plotted along the Y-axis and $T_5$, also measured in ° F., is plotted along the X-axis. For turbine inlet temperatures below 1700° F., the control 158 will modulate the mixing valve to maintain $(T_1 - T_o)$ at a constant 120° F. At turbine inlet temperatures between 1700° F. and 1800° F., the mixing valve 16 is modulated to vary $(T_1 - T_o)$ linearly from 120° F. to 0° F. For $T_5$ above 1800° F., exhaust gas recirculation is prohibted. Although higher cycle efficiencies would be realized through the use of exhaust gas recirculation at turbine inlet temperatures above 1800° F., turbine life might be reduced because the engine would operate above that temperature a greater percentage of the time.

A control system to maintain the desired cycle point temperatures and pressures throughout the Rankine loop also is provided. Referring again to FIG. 5, the Rankine cycle is controlled by the thermostatic throttle valve 40 positioned at the inlet to the Rankine turbine 34. The Rankine cycle control system is independent of the control system for the Brayton cycle and is fully automatic. It may be hydromechanical, electromechanical, or fluidic. The valve 40 controls fluid mass flow in order to maintain a constant turbine inlet temperature. For an organic working fluid such as toluene, the valve would maintain the peak Rankine cycle temperature at a constant 700° F. The Rankine turbine exit pressure varies with condensing temperature. The temperature of the condenser 46 is controlled by varying the speed of the condenser cooling fan 47 which is regulated by a variable speed drive driven, for example, by a gearbox (not shown) operated from shaft 36. For this purpose, heat sensors can be positioned in the condenser 46 and the inlet to Rankine turbine inlet. The sensors are conected to a control mechanism (not shown) which acts in accordance with the input from the two sensors to modify the operation of the fan 47. The fan speed control varies the fan drive ratio to always maintain the condenser 46 pressure in a fixed ratio relative to the pressure in the turbine inlet. The Rankine turbine will thus operate at near constant efficiency at all times since the inlet temperature and pressure ratio are held constant.

Where pyridine is used as the Rankine cycle working fluid, the Rankine loop will preferably operate with a turbine inlet temperature of 700° F., a turbine inlet pressure of 500 psia, a condenser temperature of 163° F. and a condenser pressure of 3.56 psia.

The mixing control schedule for the exhaust gas recirculation (EGR) is determined by the percentage of exhaust gas recirculation desired and the exhaust gas temperature ($T_E$). The portion of exhaust gas recirculated is determined by the following equation:

$$EGR = \frac{(T_1 - T_0)CP_{air}}{(T_E - T_0)CP_{products}}$$

where $T_1$ is the mixed gas compressor inlet temperature, $T_o$ is the ambient inlet air temperature, $T_E$ is the exhaust gas temperature, $CP_{air}$ is the specific heat of the inlet air, and $CP_{products}$ is the specific heat of the exhaust gas. Preferably in this embodiment, the percent of the exhaust gases that are recirculated is controlled between zero and 60% as a function of the turbine inlet temperature $T_5$. As stated earlier, EGR reduces the engine net mass flow and reduces the drop in turbine inlet temperatures at part load operation. By maintaining higher peak cycle temperatures, the thermal efficiency is improved.

FIG. 8 illustrates the percent of exhaust gas recirculation versus percentage of engine power level for a combined Brayton cycle-Rankine cycle engine in accordance with the embodiment of the present invention operating on the EGR control schedule in FIG. 7. Also shown in FIG. 8 is the overall fuel/air ratio versus percent engine power level based on the products of combustion in the exhaust. For this control schedule depicted in FIG. 7, the fuel/air ratio is below the stoichiometric ratio of approximately 0.067 at all operating points.

One advantage of using exhaust gas recirculation as a means of reducing engine mass flow is that it has no adverse effects on compressor efficiency. The operating line for the compressor is unchanged by EGR from the operating line without EGR. By contrast, engines which use variable turbine nozzles to control mass flow cause the compressor operating line to shift towards surge when the mass flow is reduced. As a result, variable inlet guide vanes must also be used which cause a reduction in compressor efficiency.

An actual combined cycle engine designed to include all of the features of the present invention is illustrated in FIG. 9. The various components of the engine are numbered the same as the components shown and described relative to FIGS. 1 and 4. It is understood, of course, that the physical construction of the invention can take many different forms and configurations and still contain all of the benefits and features thereof.

In the engine described above in FIGS. 1 and 4, the power turbine 24 is mechanically independent of the compressor 14. As an alternative configuration, a single-shaft engine can be provided wherein the power turbine 24, compressor 14, Rankine turbine 34 and feed pump 38 operate as a single rotor.

Another alternate configuration of a Brayton cycle-Rankine cycle combined engine in accordance with the present invention is shown in FIG. 10. In this embodiment, all of the major rotating elements are located on a common axis and an overrunning clutch coupling is positioned between the power turbine and the compressor-Rankine rotor. The gas generator comprises a compressor 170, Rankine turbine 174, and a fluid centrifugal feed pump 175, which is integral with shaft 176.

The Brayton power turbine 178 is a single-stage radial inflow type and is cantilever mounted on one end of shaft 177. The power turbine 178 is mounted on bearings in a gearbox 180. An overruning clutch 182 is provided on the shaft 176 between the power turbine 178 and the compressor 170. The clutch 182 is positioned in the gearbox 180 and is arranged so that it will engage whenever the speed of the power turbine 178 matches or exceeds that of the compressor 170, but will disengage and slip at lower turbine speeds. The coupled turbine arrangement as shown in FIG. 10 permits the engine to be operated at higher compressor pressure ratios in the coupled mode and thus increase engine efficiency. It also allows the power turbine 178 to operate at low speeds or stalled without stalling the compressor 170.

In all other respects of arrangement and control, the engine construction shown in FIG. 10 is the same as engine 10 described above with reference to FIGS. 1 and 4. Air enters the inlet duct 184 and is mixed with the exhaust gases in mixing valve 186. The air is compressed by compressor 170 and directed to burner 188 where it is raised to a high temperature. The heated and compressed gas then flows through power turbine 178 and into the heat exchanger (boiler) 190. The exhaust gases exit from the engine via outlet duct 192. A portion of the exhaust gases are directed via conduit 194 to the mixing valve 186 for recirculation as discussed above.

In the Rankine cycle, the heated working fluid travels from the boiler 190 through conduit 196 to the Rankine turbine 174. From that turbine 174, the fluid passs through the remainder of the Rankine closed-loop cycle before returning to the boiler 190. In particular, the working fluid exits from the turbine 174 as a low pressure vapor and travels through a regenerator (recuperator) 198 and a condenser 200 where it is returned to its liquid state. The liquid is then sent through the feed pump 175 (via conduits 202 and 204) and the regenerator 198, where it is returned via conduit 206 to the boiler 190 as a preheated high pressure liquid. A variable speed drive fan 208 controls the temperature of the condenser 200.

The accessory drive and reduction gearbox 180 is common with a central lubrication system. The engine accessories which are needed at all times during the operation of the engine, such as the fuel pump, oil pump, condensor fan and boost pump, are driven from the shaft 176 by accessory drive gears 210. The main reduction gears 212 and remaning accessories are driven by the power turbine 178. The main power output shaft 214 of the engine is driven in turn by the reduction gears 212.

Figure 11:
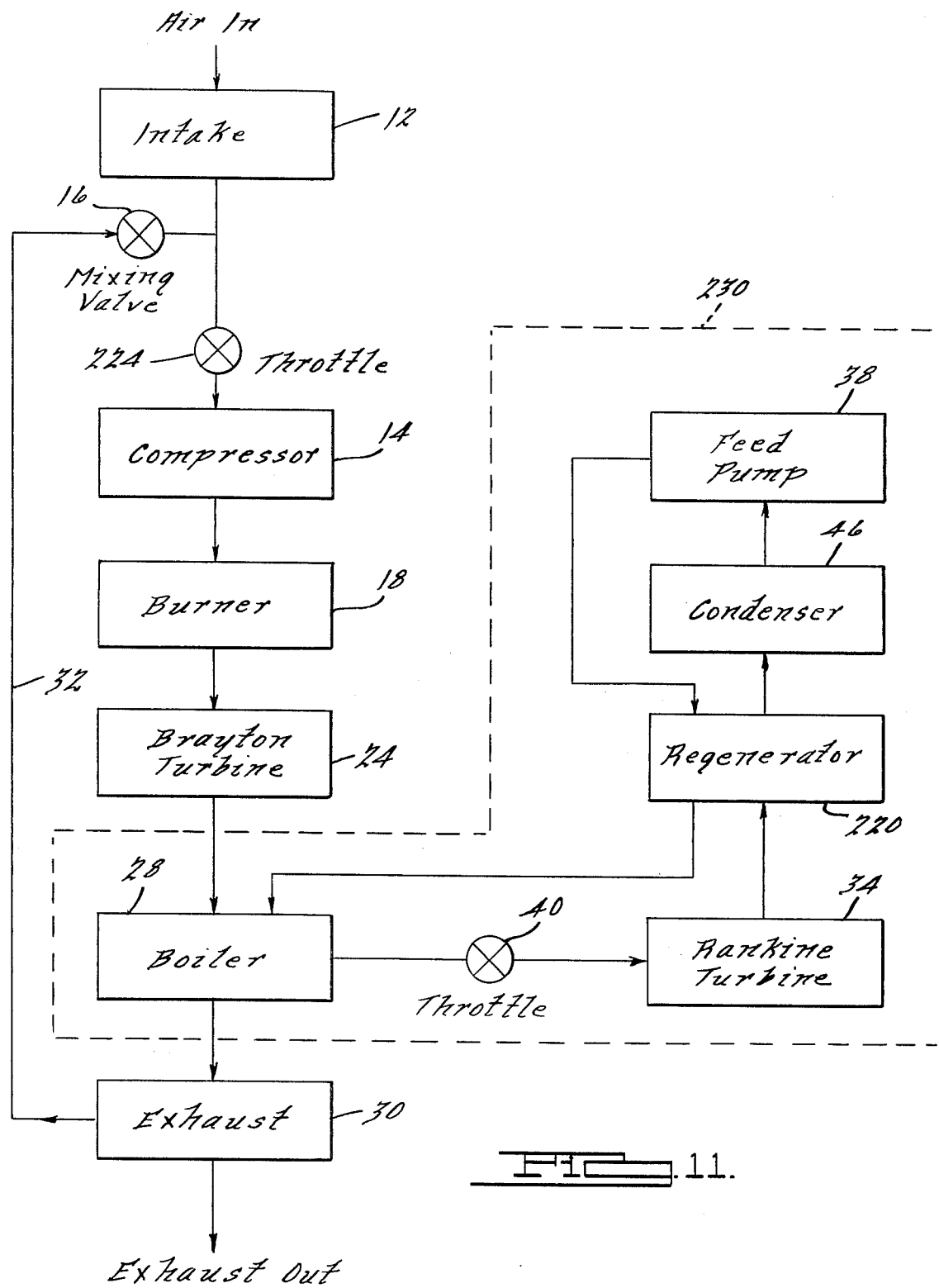

Another embodiment of the invention is shown schematically in FIG. 11. The various features and operating aspects of this engine are the same as the engines discussed above, with the additional features of regenerating the working fluid in the Rankine cycle and throttling the inlet air in the Brayton cycle. In this regard, the parts of the combined engine which are the same are numbered in the same manner as the corresponding parts discussed with reference to FIGS. 1 and 4.

Adding a regenerator 220 to the Rankine cycle of the combined cycle engine is referred to above. With the use of organic working fluids, a moderate gain in efficiency can be achieved by using a regenerator 220. Preferably, the regenerator 220 has a core of cross counterflow annular configuration which surrounds the Rankine turbine 34. The tubes containing the working fluid run axially in the core and are arranged in concentric circles penetrating continuous radial fins. The liquid flows back and forth through the tubes as the vapor passes radially outwardly.

Throttling the inlet air is accomplished by placing a valve 224 in the inlet duct 12 upstream of the compressor 14 (and downstream of the mixing valve 16). The throttle 224 is controlled to operate only at part load operation of the engine and allows improved performance over the lower range of power levels. In particular, throttling the inlet air increases the acceleration response from idle or low power levels (that is, it overcomes compressor lag) and also reduces fuel consumption at idle. Both of these items are shortcomings of typical gas turbine engines.

The throttle 224 and its control system can be of any conventional type, but preferably are similar to the apparatus and system shown and described in the copending applications of Ernest R. Earnest, Ser. No. 706,810, filed Jul. 19, 1976, now abandoned, and Ser. No. 815,251, filed Jul. 13, 1977, the disclosures of which are herein incorporated by reference.

The basic components of the engine shown schematically in FIG. 11 are shown and described in detail with reference to FIG. 1. Air enters the engine through the intake duct 12 and is raised to a pressure of several atmospheres by the compressor 14. Throttle valve 224 is positioned in the intake duct 12 and controls the flow of air to the compressor 14. From the compressor, the high pressure air enters the combustor chamber (burner) 18 where fuel is added and ignited to raise the temperature of the air. The combustion products are expanded through the main power turbine (Brayton turbine) 24 which drives an output shaft (not shown) coupled to the load. Heat from the turbine exhaust gases is used to power the heat exchanger (boiler) 28 of a closed-loop Rankine cycle 230 preferably using an organic working fluid as discussed earlier. Air and the products of combustion passing through the boiler 28 are exhausted from the engine through exhaust duct 30. A portion of the exhaust gases is recirculated via duct 32 to the mixing valve 16 where it is mixed with and introduced into the inlet air in the controlled manner described above. The control mechanism and system for recirculation of exhaust gases is preferably the same as described earlier.

The Rankine cycle 230 operates in the same manner as discussed above, and it is not necessary to go into it in further detail here.

There are a number of ways in which the compressor and turbine can be mechanically arranged in the engines. For example, the power turbine 24 can be mechanically independent of the compressor 14. This is shown in FIG. 1 and is referred to as a free-turbine engine. Also, the power turbine 24 and comressor 14 (together with the Rankine turbine 34 and feed pump 38) can be attached to a single shaft. This is called the single-shaft engine. As a further alternative, the turbine 24 and compressor 14 can be operated as part of the same shaft with an overrunning clutch positioned between them. The latter embodiment has some advantages of both the free turbine and single shaft engines and is called a coupling engine.

The power level of the combined engine shown in FIG. 11 is controlled by varying the fuel flow to the combustion chamber 18 by throttling the compressor inlet air via throttle valve 224. These are controlled by a control mechanism (not shown) which is similar to that described above with reference to FIGS. 1 and 2. When the inlet air is throttled, the control also is adapted to adjust the throttle valve 224.

At high power, the engine power level is controlled by varying the inlet temperature of the power turbine 24 with the compressor inlet throttle 224 in the open position. When a prespecified minimum inlet temperature has been reached, further power reductions are provided by throttling the inlet flow. The minimum inlet temperature is established at a figure where there will be adequate heat remaining in the turbine exhaust to drive the compressor 14, by means of the Rankine cycle 230, continuously at least at half speed. As throttling occurs, the speed of the Rankine turbine 34 and the compressor 14 remain at approximately 80% of maximum speed, while engine mass flow and fuel flow decrease. The engine can be throttled at the inlet until the pressure ratio and work of the power turbine 24 are near zero because the compressor 14 is being driven by work derived from exhaust heat only. Preferably, the air and fuel flow are reduced simultaneously so that the fuel/air ratio remains approximately constant. Thus, combustion stability is maintained and the fuel flow at idle can be very low. Because the inlet temperature of the power turbine 24 remains high, the exhaust gas temperature also remains high. Fluid and metal temperatures in the boiler 28 likewise remain at a high level so that there is little Thermal inertia to be overcome in the Rankine cycle in order to accelerate the engine.

Approximately at power levels below 25%, the compressor inlet air is throttled by throttle 224 and the turbine 24 inlet temperature is held constant at 1300° F. The throttling to control power permits the compressor 14 rotating speed to remain high to assure acceleration capability. The speed of the compressor 14 varies between 60% and 100% of maximum engine speed and is 60-80% at idle.

A combined cycle engine having throttle valve 224 has power flexibility over a wide operating speed range to assure compatability with existing transmissions, a high rate of engine response including acceleration from idle, and high efficiency over a wide power range including low fuel flow at inlet. Throttling the inlet air also maintains an adequate burner temperatue rise and fuel/air ratio in the engine at low power and idle. This helps provide a low level of exhaust emissions - particularly carbon dioxide and hydrocarbons - from the engine.

While it will be apparent that the preferred embodiments illustrated herein are well calculated to fulfill the objects above stated, it will be appreciated that the present invention is susceptible to modification, variation and change without departing from the scope of the invention, as defined by the following claims:

I claim:

1. An integrated Brayton cycle-Rankine cycle engine comprising a Rankine turbine and a rotary compressor driven thereby, a Brayton turbine and an intercycle heat exchanger heated by the exhaust of the Brayton turbine and delivering heat to the Rankine fluid for powering the Rankine turbine, a burner and air supply assembly for delivering to the Brayton turbine air from the compressor together with products of combustion from the burner, means for throttling the amount of air entering the compressor, and means for recirculating a portion of the exhaust gases from the Brayton turbine into the compressor.

2. An integrated Brayton cycle-Rankine cycle engine comprising a Rankine turbine and a rotary compressor driven thereby, a Brayton turbine and an intercycle heat exchanger heated by the exhaust of the Brayton turbine and delivering heat to the Rankine fluid for powering the Rankine turbine, a burner and air supply assembly for delivering air from the compressor and products of combustion from the burner to the Brayton turbine, recirculation means for recirculating a portion of the exhaust products from the Brayton turbine into the compressor in order to increase the thermal efficiency of the engine, and control means for regulating the recirculation of exhaust products to the compressor, said control means adjusting the degree of exhaust recirculation to modulate the compressor inlet temperature in accordance with a predetermined schedule of $(T_1-T_0)$ versus an operator input function $N_{1corr}$(demand), where $T_1$ is the compressor inlet temperature, $T_0$ is the ambient air temperature, and $N_{1corr}$(demand) is the operative input function of corrected compressor speed.

3. The engine as set forth in claim 2 further comprising fuel adjustment means for adjusting the fuel flow to the burner, said fuel adjustment means comprising a closed loop governor which monitors the gas generator corrected speed as a function of $N_{1corr}$(demand).

4. The engine as set forth in claim 2 wherein said control means decreases the portion of exhaust gases recirculated when $N_{1corr}$(demand) is increased.

5. The engine as set forth in claim 2 wherein said control means decreases the portions of exhaust gases recirculated when the fuel flow is increased and increases the portion of exhaust gases recirculated when the fuel flow is decreased.

6. An engine set forth in claim 2 wherein said control means prevents the recirculation of exhaust gases when $N_{1corr}$ (demand) reaches its maximum value.

7. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, valve means positioned upstream of said compressor inlet for adjusting the recirculation of exhaust gases from the power turbine to the compressor, control means for regulating said valve means in order to recirculate a prespecified portion of the exhaust gases, said control means being responsive to at least the power turbine operator pedal position and the compressor inlet temperature, and adapted to adjust the degree of exhaust gas recirculation to modulate the compressor inlet temperature in accordance with a predetermined schedule of $T_1-T_o$ vs. $N_{1corr}$(demand), where $T_1$ is the compressor inlet temperature, $T_o$ is the ambient air temperature, and $N_{1corr}$(demand) is the operative input function of corrected compressor speed, means including a single-stage Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

8. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, valve means positioned upstream of said compressor inlet for adjusting the recirculation of exhaust gases from the power turbine to the compressor, engine control means for regulating said valve means in order to recirculate a prespecified portion of the exhaust gases and for regulating the amount of fuel supplied to said combustion chamber, said control means adapted to adjust the degree of exhaust gas recirculation to modulate the compressor inlet temperature in accordance with a predetermined schedule of $T_1-T_0$ v. $N_{1corr}$(demand), where $T_1$ is the compressor inlet temperature, $T_0$ is the ambient air temperature, and $N_{1corr}$(demand) is the operative input function of corrected compressor speed, means including a single-stage Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

9. An integrated Brayton cycle-Rankine cycle engine comprising a Rankine turbine and a rotary compressor driven thereby, a Brayton turbine and an intercycle heat exchanger heated by the exhaust of the Brayton turbine and delivering heat to the Rankine fluid for powering the Rankine turbine, a burner and air supply assembly for delivering air from the compressor and products of combustion from the burner to the Brayton turbine, recirculation means for recirculating a portion of the exhaust gases from the Brayton turbine into the compressor in order to increase the thermal efficiency of the engine, and throttle means for throttling the inlet flow into the compressor.

10. The engine as set forth in claim 9 further comprising control means for measuring the Brayton turbine inlet temperature and adjusting the throttle means in accordance therewith in order to maintain said turbine inlet temperature within a prespecified range.

11. The engine as set forth in claim 10 wherein the prespecified minimum temperature is selected so that sufficient heat remains in the Brayton turbine exhaust to drive the compressor continuously at least at 50% speed.

12. The engine as set forth in claim 10 wherein said temperature range is 1300° F. to 1800° F.

13. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, valve means positioned upstream of said compressor inlet for adjusting the recirculation of exhaust gases from the power turbine to the compressor, control means for regulating said valve means in order to recirculate a prespecified portion of the exhaust gases, said control means being responsive to at least the power turbine operator pedal position and the compressor inlet temperature, means including a single-stage Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, condensing means connected to the outlet of the Rankine turbine and to the inlet of the heat exchanger for returning the condensed vaporized fluid to the heat exchanger, said compressor, power turbine and Rankine turbine being mounted along the same axis on an interconnecting shaft, and an overrunning clutch positioned on said shaft between said power turbine and said compressor.

14. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, valve means positioned upstream of said compressor inlet for adjusting the recirculation of exhaust gases from the power turbine to the compressor, control means for regulating said valve means in order to recirculate a prespecified portion of the exhaust gases, said control means being responsive to at least the power turbine operator pedal position and the compressor inlet temperature, throttle means positioned upstream of said compressor for adjusting the amount of air flow supplied to the compressor and wherein said control means is adapted to adjust said throttle means in order to maintain the power turbine inlet temperature within a prespecified temperature range, means including a single-stange Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

15. The engine as set forth in claim 14 wherein the minimum temperature of said prespecified temperature range is selected so that sufficient heat remains in the power turbine exhaust to drive the compressor continuously at greater than 50% speed.

16. An engine comprising in combination a single-stage main power turbine having an inlet and an exhaust, a single-stage compressor having an inlet and outlet, a combustion chamber situated between said compressor and said main power turbine, said compressor and combustion chamber supplying the main power turbine with air and products of combustion to power the same, valve means positioned upstream of said compressor inlet for adjuseting the recirculation of exhaust gases from the power turbine to the compressor, engine control means for regulating said valve means in order to recirculate a prespecified portion of the exhaust gases and for regulating the amount of fuel supplied to said combustion chamber, throttle means positioned upstream of said compressor for adjusting the amount of air flow supplied to the compressor, said control means adapted to adjust said throttle means in order to maintain the power turbine inlet temperature within a prespecified temperature range, means including a single-stage Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

17. The engine as set forth in claim 16 wherein the minimum temperature of said prespecified temperature range is selected so that sufficient heat remains in the power turbine exhaust to drive the compressor continuously at greater than 50% speed.

18. The engine as set forth in claim 16 wherein the air flow to the compressor and the fuel flow to the combustion chamber are reduced in accordance with the temperature at said Brayton turbine inlet in order to maintain the Brayton turbine inlet temperature within prespecified limimts, whereby at idle and low power levels combustion stability is maintained, fuel flow is minimized, and sufficient heat remains in the Brayton turbine exhaust to drive the compressor continuously at greater than 50% speed.

* * * * *

UNITED STATES PATENT AND TRADEMARK OFFICE
CERTIFICATE OF CORRECTION

PATENT NO. : 4,204,401  Page 1 of 2
DATED : May 27, 1980
INVENTOR(S) : Ernest R. Earnest/Hydragon Corporation It is certified that error appears in the above-identified patent and that said Letters Patent are hereby corrected as shown below:

Column 4, Line 21   "$T^1$" should be --$T_0$--

Column 5, Line 3    "EGR = $\dfrac{T_1 - T_0}{T_3 - T_0}$" should be --EGR = $\dfrac{T_1 - T_0}{T_e - T_0}$--

Column 5, Line 5    "(7')" should be --(7)'--

Column 5, Line 10   After "and" delete --the--

Column 6, Line 6    "$\dfrac{T_6 - T_e}{T_6 \cdot T_{R2}}$" should be --$\dfrac{T_6 - T_e}{T_6 - T_{R2}}$--

Column 9, Line 20-21 "Designed" should be --designated--

Column 9, Line 28   "$N_{1corr} = N_1/\sqrt{T_1/T}_{standard}$" should be --$N_{1corr} = N_1/\sqrt{T_1/T_{standard}}$--

Column 16, Line 44  "passs" should be --passes--

UNITED STATES PATENT AND TRADEMARK OFFICE
CERTIFICATE OF CORRECTION

PATENT NO. : 4,204,401

DATED : May 27, 1980

INVENTOR(S) : Ernest R. Earnest/Hydragon Corporation

It is certified that error appears in the above-identified patent and that said Letters Patent are hereby corrected as shown below:

Claim 14 - Column 21, line 55, "stange" should be --stage--

Claim 16, Column 22, line 21, "adjuseting" should be --adjusting--

Signed and Sealed this

Second Day of December 1980

[SEAL]

Attest:

SIDNEY A. DIAMOND

Attesting Officer

Commissioner of Patents and Trademarks